(12) United States Patent
Shao et al.

(10) Patent No.: US 12,321,165 B2
(45) Date of Patent: Jun. 3, 2025

(54) METHODS AND INTERNET OF THINGS (IOT) SYSTEMS FOR MAINTAINING APPURTENANT FACILITIES OF SMART GAS PIPELINE NETWORKS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Yuefei Wu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/668,233

(22) Filed: May 19, 2024

(65) Prior Publication Data
US 2024/0302834 A1 Sep. 12, 2024

(30) Foreign Application Priority Data
Apr. 28, 2024 (CN) .......................... 202410519863.3

(51) Int. Cl.
G05B 23/02 (2006.01)
(52) U.S. Cl.
CPC ....... G05B 23/0283 (2013.01); G05B 23/024 (2013.01)
(58) Field of Classification Search
CPC .............. G05B 23/0283; G05B 23/024; G05B 23/0286; G05B 23/0289; G05B 23/0291; G05B 23/0297; G05B 23/0224
See application file for complete search history.

(56) References Cited

U.S. PATENT DOCUMENTS

| | | |
|---|---|---|
| 2023/0175652 A1 | 6/2023 | Shao et al. |
| 2023/0230018 A1 | 7/2023 | Shao et al. |
| (Continued) | | |

FOREIGN PATENT DOCUMENTS

| | | |
|---|---|---|
| CN | 101488213 A | 7/2009 |
| CN | 110232520 A | 9/2019 |
| (Continued) | | |

OTHER PUBLICATIONS

First Office Action in Chinese Application No. 202410519863.3 mailed on May 31, 2024, 10 pages.
(Continued)

*Primary Examiner* — Manuel L Barbee
(74) *Attorney, Agent, or Firm* — METIS IP LLC

(57) ABSTRACT

Disclosed is a method, an IoT system, and a storage medium for maintaining an appurtenant facility of a smart gas pipeline network. The method may include: obtaining historical maintenance data and data collection information of an appurtenant monitoring device and storing the historical maintenance data and data collection information in a storage unit; determining whether the appurtenant monitoring device requires maintenance based on the historical maintenance data and data collection information; in response to determining that the appurtenant monitoring device requires maintenance, determining a maintenance parameter and generating a maintenance instruction; sending the maintenance instruction to an interactive interface; obtaining an evaluation parameter of the storage unit; in response to determining that the evaluation parameter of the storage unit satisfies a preset parameter requirement, generating an adjustment instruction and sending the adjustment instruction to the storage unit.

5 Claims, 5 Drawing Sheets

(56) References Cited

U.S. PATENT DOCUMENTS

2024/0126253 A1    4/2024   Shao et al.
2024/0202672 A1    6/2024   Shao et al.

FOREIGN PATENT DOCUMENTS

| | | | |
|---|---|---|---|
| CN | 211437307 U | | 9/2020 |
| CN | 113449120 A | | 9/2021 |
| CN | 113486494 A | | 10/2021 |
| CN | 115310839 A | | 11/2022 |
| CN | 115619071 A | | 1/2023 |
| CN | 116095658 A | | 5/2023 |
| CN | 116109104 A | | 5/2023 |
| CN | 116342108 A | * | 6/2023 |
| CN | 117291352 A | | 12/2023 |
| CN | 117495356 A | | 2/2024 |
| CN | 117592736 A | | 2/2024 |
| CN | 117669964 A | | 3/2024 |
| WO | 2019216975 A1 | | 11/2019 |

OTHER PUBLICATIONS

Decision to Grant a Patent in Chinese Application No. 202410519863.3 mailed on Jun. 14, 2024, 2 pages.
Zheng, Taiqi et al., Current Situation Analysis and Safety trend of Urban Gas pipelines, Office Automation, 2014, 8 pages.

\* cited by examiner

200

210 Obtaining historical maintenance data for an appurtenant monitoring device based on an interactive interface and storing the historical maintenance data in a storage unit

220 Controlling the attached monitoring device, at an initial preset frequency, to acquire data collection information and storing the data collection information in the storage unit

230 Determining whether or not the appurtenant monitoring device requires maintenance based on the historical maintenance data and the data collection information of the appurtenant monitoring device

240 In response to determining that the appurtenant monitoring device requires maintenance, determining a maintenance parameter and generating a maintenance instruction

250 Sending the maintenance instruction to the interactive interface via a delivery unit

260 Obtaining an evaluation parameter of the storage unit

270 In response to determining that the evaluation parameter of the storage unit satisfies a preset parameter requirement, generating an adjustment instruction and sending the adjustment instruction to the storage unit via the delivery unit

FIG. 2

METHODS AND INTERNET OF THINGS (IOT) SYSTEMS FOR MAINTAINING APPURTENANT FACILITIES OF SMART GAS PIPELINE NETWORKS

CROSS-REFERENCE TO RELATED APPLICATIONS

This application claims priority of Chinese Patent Application No. 202410519863.3 filed on Apr. 28, 2024, the entire contents of which are incorporated herein by reference.

TECHNICAL FIELD

The present disclosure relates to the field of maintenance and management of appurtenant facilities of gas pipeline networks, and in particular, to methods, Internet of Things (IoT) systems, and storage media for maintaining appurtenant facilities of smart gas pipeline networks.

BACKGROUND

Damages to gas pipelines not only result in economic losses but also pose a potential threat to the safety of residents' lives. With the development of cities, gas pipelines are becoming increasingly dense, and a count of appurtenant facilities of gas pipelines is also continuously increasing.

In existing technologies, maintenance data of an appurtenant facility of a gas pipeline is collected at fixed intervals and stored in a storage unit, and then it is determined whether the appurtenant facility of the gas pipeline needs maintenance based on historical maintenance data. This approach is limited by a storage performance of the storage unit. When valid data in the historical maintenance data is limited, it may not be accurately determined whether the appurtenant facility of the gas pipeline needs maintenance. Due to the inability of existing gas pipeline management techniques to achieve timely maintenance, accidents caused by failures of appurtenant facilities of gas pipelines occur frequently.

Therefore, it is desirable to provide a method and an Internet of Things (IoT) system for maintaining an appurtenant facility of a smart gas pipeline network for the management and maintenance of appurtenant facilities of gas pipelines, thereby preventing accidents and reducing a probability of failures.

SUMMARY

One or more embodiments of the present disclosure provide a method for maintaining an appurtenant facility of a smart gas pipeline network. The method may be executed by a smart gas pipeline network safety management platform, and the method may include: obtaining historical maintenance data of an appurtenant monitoring device based on an interactive interface and storing the historical maintenance data in a storage unit; controlling the appurtenant monitoring device, at an initial preset frequency, to acquire data collection information and storing the data collection information in the storage unit; and determining whether or not the appurtenant monitoring device requires maintenance based on the historical maintenance data and the data collection information of the appurtenant monitoring device. The method may further include: in response to determining that the appurtenant monitoring device requires maintenance, determining a maintenance parameter and generating a maintenance instruction; sending the maintenance instruction to the interactive interface via a delivery unit; obtaining an evaluation parameter of the storage unit, wherein the evaluation parameter may include at least one of a remaining storage capacity, a read speed, a write speed, and a response time. The method may further include: in response to determining that the evaluation parameter of the storage unit satisfies a preset parameter requirement, generating an adjustment instruction and sending the adjustment instruction to the storage unit via the delivery unit. The adjustment instruction may include a deletion instruction and/or a frequency adjustment instruction, the deletion instruction may be used to perform a deletion of object data, the deletion instruction may include a timestamp of the object data, the timestamp may be determined based on an importance level of the appurtenant monitoring device, and the object data may include the historical maintenance data and/or the data collection information of the appurtenant monitoring device. The frequency adjustment instruction may be used to adjust the initial preset frequency, and the frequency adjustment instruction may include an adjusted preset frequency.

One or more embodiments of the present disclosure provide an Internet of Things (IoT) system for maintaining an appurtenant facility of a smart gas pipeline network. The IoT system may include a smart gas user platform, a smart gas service platform, a smart gas pipeline network safety management platform, a smart gas pipeline network sensing network platform, and a smart gas pipeline network object platform. The smart gas pipeline network safety management platform may be configured to implement the method for maintaining the appurtenant facility of the smart gas pipeline network.

The present disclosure further provides a non-transitory computer-readable storage medium. The storage medium may store one or more sets of computer instructions, and after reading the one or more sets of computer instructions in the storage medium, a computer executes the method for maintaining the appurtenant facility of the smart gas pipeline network described in the embodiments of the present disclosure.

The beneficial effects brought about by the present disclosure may include but are not limited to: (1) Real-time tracking of the remaining storage capacity, read speed, write speed, and response time of the storage unit, timely deletion of old data in the storage unit, and reduction of the collection frequency of maintenance data can improve the performance of the storage unit, retain more important maintenance data, and improve the accuracy of determining whether the appurtenant monitoring device needs maintenance. (2) Determination of the focused detection period based on the dust deposition characteristic of the appurtenant monitoring device, analysis of the data detected by the appurtenant monitoring device during the focused detection period to obtain the analysis result, and determination of whether the appurtenant monitoring device needs maintenance based on the analysis result can save computing resources and accurately determine the appurtenant monitoring device in need of maintenance due to excessive dust deposition. (3) Determination of the maintenance urgency degree of multiple appurtenant monitoring devices in need of maintenance based on the dust deposition characteristic and data collection characteristic of the multiple appurtenant monitoring devices in need of maintenance, and determination of the maintenance sequence of the multiple appurtenant monitoring devices in need of maintenance according to the maintenance urgency degree can prioritize maintenance personnel to perform maintenance on appurtenant monitoring devices with higher maintenance urgency, thereby reducing the probability of failures.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 2 is a flowchart illustrating an exemplary process for generating an adjustment instruction according to some embodiments of the present disclosure;

DETAILED DESCRIPTION

Figure 1:
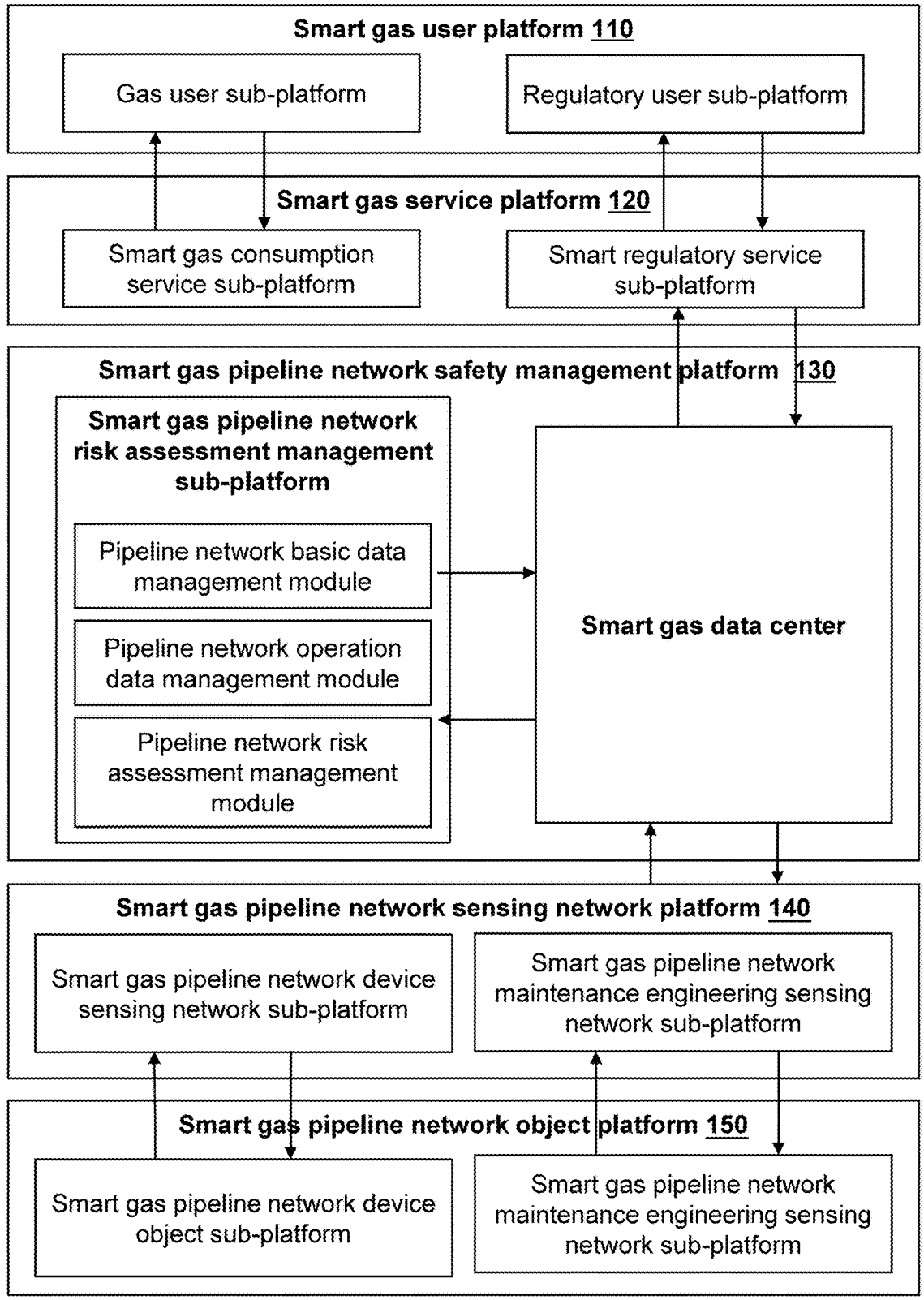
FIG. 1 is a schematic diagram illustrating an application scenario of an Internet of Things (IoT) system for maintaining an appurtenant facility of a smart gas pipeline network according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, the operations may be executed in reverse order or simultaneously. Additionally, one or more other operations may be added to these processes, or one or more operations may be removed from these processes.

FIG. 1 is a schematic diagram illustrating an application scenario of an Internet of Things (IoT) system for maintaining an appurtenant facility of a smart gas pipeline network according to some embodiments of the present disclosure.

In some embodiments, an IoT system 100 for maintaining an appurtenant facility of a smart gas pipeline network may include a smart gas user platform 110, a smart gas service platform 120, a smart gas pipeline network safety management platform 130, a smart gas pipeline network sensing network platform 140, and a smart gas pipeline network object platform 150.

The smart gas user platform 110 may be a platform for interacting with a user. In some embodiments, the smart gas user platform 110 may be configured as a terminal device, for example, a desktop computer, a tablet, or the like.

In some embodiments, the smart gas user platform 110 may include a gas user sub-platform and a regulatory user sub-platform. The gas user sub-platform is oriented towards a gas user, which may be configured to receive gas-related data and a gas problem solution sent by a smart gas consumption service sub-platform, and send a query instruction for the gas-related data and a query instruction for the gas problem solution to the smart gas consumption service sub-platform. The regulatory user sub-platform is oriented towards a regulatory user (e.g. a user of a safety regulatory department), which may be configured to receive pipeline network risk reminder information and a monitoring solution (e.g. a pipeline network maintenance strategy, an inspection strategy, a troubleshooting strategy, etc.) sent by a smart regulatory service sub-platform, and send a query instruction for pipeline network risk assessment information and a query instruction for the monitoring solution to the smart regulatory service sub-platform.

The smart gas service platform 120 may be a platform for receiving and transmitting data and/or information. For example, the smart gas service platform 120 may be configured to receive the gas problem solution uploaded by a smart gas data center of the smart gas pipeline network safety management platform 130 and send the gas problem solution to the smart gas user platform 110. In some embodiments, the smart gas service platform 120 may be configured to receive the query instruction (e.g., the query instruction for the gas-related data, the query instruction for the pipeline network risk assessment information, etc.) issued by the smart gas user platform 110, and send the query instruction to the smart gas data center of the smart gas pipeline network safety management platform 130.

In some embodiments, the smart gas service platform 120 may include a smart gas consumption service sub-platform and a smart regulatory service sub-platform. The smart gas consumption service sub-platform may be configured to receive the gas-related data and the gas problem solution uploaded by the smart gas data center of the smart gas pipeline network safety management platform 130, and transmit the gas-related data and the gas problem solution to the gas user sub-platform. The smart gas consumption service sub-platform may be further configured to receive the query instruction for the gas-related data sent by the gas user sub-platform, and send the query instruction for the gas-related data to the smart gas data center of the smart gas pipeline network safety management platform 130. The smart regulatory service sub-platform may be configured to receive the pipeline network risk reminder information and the monitoring solution uploaded by the smart gas data center of the smart gas pipeline network safety management platform 130, and transmit the pipeline network risk reminder information and the monitoring solution to the regulatory user sub-platform. The smart regulatory service sub-platform may be further configured to receive the query instruction for the pipeline network risk assessment information sent by the regulatory user sub-platform, and send the query instruction for the pipeline network risk assessment information to the smart gas data center of the smart gas pipeline network safety management platform 130.

The smart gas pipeline network safety management platform 130 may be a platform that coordinates and harmonizes the connection and collaboration between various functional platforms, aggregates all information of the IoT system, and provides perception management and control management functions for the operation of the IoT system. For example, the smart gas pipeline network safety management platform 130 may be configured to receive historical maintenance data and data collection information of an appurtenant monitoring device transmitted by the smart gas pipeline network sensing network platform 140, and determine whether or not the appurtenant monitoring device requires maintenance.

In some embodiments, the smart gas pipeline network safety management platform 130 may include a smart gas pipeline network risk assessment management sub-platform and the smart gas data center. The smart gas pipeline network risk assessment management sub-platform may include a pipeline network basic data management module, a pipeline network operation data management module, and a pipeline network risk assessment management module.

The pipeline network basic data management module may be configured to manage basic data information of the pipeline network, such as an environment of the pipeline network, a service life of the pipeline network, a material of the pipeline network, or the like. The pipeline network operation data management module may be configured to manage operation data information of the pipeline network, such as a pressure of the pipeline network, leakage data, a maintenance situation, or the like. The pipeline network risk assessment management module may be configured to assess a risk of the pipeline network based on the basic data of the pipeline network and the operation data of the pipeline network. For example, the pipeline network risk assessment management module may assess a safety risk of the pipeline network based on the basic data of the pipeline network and the operation data of the pipeline network by using a preset model (e.g., a machine learning model, etc.), classify risk levels of safety risks based on a risk assessment result, and combine with the Geographic Information System (GIS) to achieve three-dimensional visualization management with different colors distinguishing different regions.

In some embodiments, the smart gas data center may be configured to receive the historical maintenance data and the data collection information of the appurtenant monitoring device sent by the smart gas pipeline network sensing network platform 140, and send the historical maintenance data and the data collection information to the smart gas pipeline network risk assessment management sub-platform for processing respectively. When the processing is completed, the historical maintenance data and the data collection information are sent to the smart gas data center, which summarizes and stores the processed data and sends the processed data through the smart gas service platform 120 to the smart gas user platform 110. In some embodiments, the smart gas data center may also be configured to receive a query instruction sent by the smart gas service platform 120 and to send the query instruction down to the smart gas pipeline network sensing network platform 140.

The smart gas pipeline network sensing network platform 140 may be a platform for processing, storing, and transmitting data and/or information. For example, the smart gas pipeline network sensing network platform 140 may be configured to receive the historical maintenance data and the data collection information of the appurtenant monitoring device obtained by the smart gas pipeline network object platform 150 and transmit the historical maintenance data and the data collection information to the smart gas data center. In some embodiments, the smart gas pipeline network sensing network platform 140 may be configured as a communication network and gateway.

In some embodiments, the smart gas pipeline network sensing network platform 140 may include a smart gas pipeline network device sensing network sub-platform and a smart gas pipeline network maintenance engineering sensing network sub-platform. The smart gas pipeline network device sensing network sub-platform may be configured to receive the data collection information of the appurtenant monitoring device of a smart gas pipeline network device object sub-platform (e.g., a pipeline, etc.) and send the data collection information to the smart gas data center. The smart gas pipeline network device sensing network sub-platform may also be configured to receive a data collection instruction of the appurtenant monitoring device issued by the smart gas data center and send the data collection instruction to the smart gas pipeline network device object sub-platform. The smart gas pipeline network maintenance engineering sensing network sub-platform may be configured to receive a instruction to obtain the historical maintenance data of the appurtenant monitoring device from the smart gas data center, and transmit the instruction to the smart gas pipeline network maintenance engineering object sub-platform. The smart gas pipeline network maintenance engineering sensing network sub-platform may also be configured to receive feedback from the smart gas pipeline network maintenance engineering object sub-platform on the execution of remote scheduling management information, and upload the feedback to the smart gas data center.

The smart gas pipeline network object platform 150 may be a functional platform for obtaining data and/or information related to a pipeline network object. For example, the smart gas pipeline network object platform 150 may be configured to obtain the historical maintenance data and the data collection information of the appurtenant monitoring device and transmit the historical maintenance data and the data collection information to the smart gas data center via the smart gas pipeline network sensing network platform 140. In some embodiments, the smart gas pipeline network object platform 150 may be configured as various types of pipeline network devices.

In some embodiments, the smart gas pipeline network object platform 150 may include a smart gas pipeline network device object sub-platform and a smart gas pipeline network maintenance engineering object sub-platform. The smart gas pipeline network device object sub-platform may be configured to receive the data collection instruction of the appurtenant monitoring device transmitted by the smart gas pipeline network sensing network platform 140, and after acquiring the data collection information of the appurtenant monitoring device, upload the data collection information to the smart gas data center via the smart gas pipeline network sensing network platform 140. The smart gas pipeline network maintenance engineering object sub-platform may be configured to obtain the historical maintenance data of the appurtenant monitoring device based on the instruction to obtain the historical maintenance data of the appurtenant monitoring device transmitted by the smart gas pipeline network sensing network platform 140 and upload the historical maintenance data to the smart gas data center via the smart gas pipeline network sensing network platform 140.

In some embodiments of the present disclosure, the IoT system 100 for maintaining the appurtenant facility of the smart gas pipeline network are constructed through an IoT functional system of five platforms, wherein the smart gas pipeline network safety management platform 130 is arranged in combination with the smart gas data center, and the smart gas user platform 110, the smart gas service platform 120, the smart gas pipeline network sensing network platform 140, and the smart gas pipeline network object platform 150 are separate sub-platforms arranged in a way that ensures independence between different types of data, guarantees the classification, transmission, traceability of data and the classification and processing of instructions, thereby making the structure of the IoT system and data processing clear and controllable and facilitating the control and data processing of the IoT system.

It should be noted that the above descriptions of the IoT system 100 for maintaining the appurtenant facility of the smart gas pipeline network and its modules are provided only for descriptive convenience, and do not limit the present disclosure to the scope of the cited embodiments. It is to be understood that for a person of ordinary skills in the art, after understanding the principle of the system, it may be possible to arbitrarily combine individual modules or constitute a subsystem to connect with other modules without departing from this principle. In some embodiments, the smart gas user platform 110, the smart gas service platform 120, the smart gas pipeline network safety management platform 130, the smart gas pipeline network sensing network platform 140 and the smart gas pipeline network object platform 150 disclosed in FIG. 1 may be different modules in a single system, or a single module realizing the functions of two or more of the above-described modules. For example, two or more modules may share a storage module, and two or more modules may each have a respective storage module. Modifications such as these are within the scope of protection of the present disclosure.

FIG. 2 is a flowchart illustrating an exemplary process for generating an adjustment instruction according to some embodiments of the present disclosure.

As shown in FIG. 2, a process 200 includes the following operations. In some embodiments, the process 200 may be executed by the smart gas pipeline network safety management platform 130.

In 210, obtaining historical maintenance data of an appurtenant monitoring device based on an interactive interface and storing the historical maintenance data in a storage unit.

The interactive interface refers to a working interface through which personnel interact with the IoT system 100 for maintaining the appurtenant facility of the smart gas pipeline network. For example, the interactive interface may include a dashboard, a web interface, or the like. The interactive interface may be realized based on a mobile terminal corresponding to the smart gas user platform.

The appurtenant monitoring device refers to a device for monitoring the operation of a gas pipeline. For example, the appurtenant monitoring device may include a gas alarm, a smoke detector, an ignition protection device, a leakage protector, a gas flow meter, or the like. The gas alarm is configured to monitor whether a gas leak occurs in a gas pipeline; the smoke detector is configured to monitor the concentration of smoke generated after a gas leak; the ignition protection device is configured to monitor whether an open fire or a spark exists after a gas leak; the leakage protector is configured to monitor whether there is leakage in the gas pipeline; and the gas flow meter is configured to monitor the flow of gas.

The historical maintenance data refers to data information related to past maintenance performed on the appurtenant monitoring device. For example, the historical maintenance data may include a historical maintenance time, a historical dust deposition amount, etc., of the appurtenant monitoring device. The historical dust deposition amount refers to an amount of dust accumulated on the appurtenant monitoring device during a time from the last maintenance to the current maintenance during historical use.

The storage unit refers to a device for storing data related to the appurtenant monitoring device, and the data related to the appurtenant monitoring device includes the historical maintenance data, the data collection information, or the like. For example, the storage unit may include an internal hard disk drive, a solid state drive (SSD), or the like. In some embodiments, the storage unit may be disposed in the smart gas data center of the smart gas pipeline network safety management platform 130.

In 220, controlling the appurtenant monitoring device, at an initial preset frequency, to acquire data collection information and storing the data collection information in the storage unit.

The initial preset frequency refers to a frequency preset for controlling the appurtenant monitoring device to obtain the data collection information.

In some embodiments, the smart gas pipeline network safety management platform 130 may determine the initial preset frequency in a variety of ways. In some embodiments, the initial preset frequency may be correlated with a climate dryness and an airborne dust concentration, and the drier the climate and the more dust in the air, the easier it is for the dust to be deposited on a surface of the appurtenant monitoring device, and thus, it is necessary to raise the initial preset frequency to improve the accuracy of the data collection information. The smart gas pipeline network safety management platform 130 may determine the initial preset frequency based on the climate dryness and the airborne dust concentration through an initial preset frequency relationship table.

The smart gas pipeline network safety management platform 130 may obtain the climate dryness and the airborne dust concentration in various ways. For example, the smart gas pipeline network safety management platform 130 may determine the climate dryness and the airborne dust concentration via a humidity sensor and a dust concentration sensor, respectively.

The initial preset frequency relationship table is a preset table that includes a correspondence between the climate dryness, the airborne dust concentration, and the initial preset frequency, which may be constructed on the basis of a correspondence between a historical climate dryness, a historical airborne dust concentration, and a historical initial preset frequency.

The data collection information refers to data information related to a monitoring and collection process of the appurtenant monitoring device. The monitoring and collection process refers to a process of monitoring and collecting gas-related information by the appurtenant monitoring device. In some embodiments, the data collection information may include a response time, a response time sequence, a value of collected target data, or the like.

The response time refers to a time when the appurtenant monitoring device completes the monitoring and collection process and stores the data collection information into the storage unit. The response time sequence refers to a sequence composed of response time. In some embodiments, the response time sequence may be represented by (a, b, c, . . . ), wherein a, b, and c denote a first response time, a second response time, and a third response time of the appurtenant monitoring device, respectively. More descriptions of the value of the collected target data may be found in FIG. 3 and the related descriptions thereof.

In some embodiments, the smart gas pipeline network safety management platform 130 may control the appurtenant monitoring device to obtain the data collection information in various ways. For example, the smart gas pipeline network safety management platform 130 may obtain the data collection information of the appurtenant monitoring device through a device logs, an application programming interface (API), etc.

In 230, determining whether or not the appurtenant monitoring device requires maintenance based on the historical maintenance data and the data collection information of the appurtenant monitoring device.

In some embodiments, the smart gas pipeline network safety management platform 130 may determine a maintenance status of the appurtenant monitoring device through vector retrieval based on the historical maintenance data and the data collection information, and the maintenance status includes that the appurtenant monitoring device requires maintenance or does not require maintenance, which may be represented by 1 and 0, respectively.

In some embodiments, the smart gas pipeline network safety management platform 130 may construct a to-be-matched vector based on the historical maintenance data and the data collection information. The smart gas pipeline network safety management platform 130 may retrieve in a vector database based on the to-be-matched vectors, obtain a reference vector whose vector distance from the to-be-matched vector is less than a distance threshold, and determine a historical maintenance status corresponding to the reference vector as a current maintenance status of the appurtenant monitoring device.

The vector database stores a plurality of reference vectors and their corresponding historical maintenance statuses. The plurality of reference vectors are constructed based on the historical maintenance data and historical data collection information, and the historical maintenance statuses refer to actually maintenance statuses corresponding to the historical maintenance data and the historical data collection information.

In some embodiments, the smart gas pipeline network safety management platform 130 may determine, based on an analysis result, whether the appurtenant monitoring device requires maintenance. More descriptions may be found in FIG. 3 and the related descriptions thereof.

In 240, in response to determining that the appurtenant monitoring device requires maintenance, determining a maintenance parameter and generating a maintenance instruction.

The maintenance parameter refers to a parameter related to the maintenance of the appurtenant monitoring device. In some embodiments, the maintenance parameter may include a maintenance urgency degree of the appurtenant monitoring device and a maintenance sequence of the appurtenant monitoring device. The maintenance urgency degree refers to a degree of urgency for the maintenance of the appurtenant monitoring device, and the maintenance sequence refers to a sequence in which a plurality of appurtenant monitoring devices are maintained. More descriptions of the maintenance urgency degree and the maintenance sequence may be found in FIG. 5 and the related descriptions thereof.

The maintenance instruction refers to an instruction for performing maintenance on the appurtenant monitoring device. For example, the maintenance instruction may be "arranging staff member A to perform maintenance on the gas alarm, and the maintenance is to be completed by 12:00 a.m. tomorrow".

In some embodiments, the smart gas pipeline network safety management platform 130 may determine the maintenance instruction for the appurtenant monitoring device through vector retrieval based on the maintenance urgency degree and the maintenance sequence. The maintenance instruction may be determined in a similar manner to the determination of the maintenance status of the appurtenant monitoring device, as may be found in the preceding related descriptions.

In 250, sending the maintenance instruction to the interactive interface via a delivery unit.

The delivery unit refers to a unit that sends the maintenance instruction to the interactive interface. The delivery unit may send the maintenance instruction to the interactive interface in various feasible ways. For example, the delivery unit may send the maintenance instruction to the interactive interface via Wi-Fi, Bluetooth, Ethernet, etc. In some embodiments, the delivery unit may be realized based on the smart gas service platform of the IoT system 100 for maintaining the appurtenant facility of the smart gas pipeline network.

In 260, obtaining an evaluation parameter of the storage unit.

The evaluation parameter refers to a parameter for evaluating a storage performance of the storage unit. In some embodiments, the evaluation parameter may include at least one of a remaining storage capacity, a read speed, a write speed, and a response time. The read speed is the speed at which data is read from the storage unit; the write speed is the speed at which the data is written to the storage unit; and the response time is the time at which the storage unit responds to a read or write request.

In 270, in response to determining that the evaluation parameter of the storage unit satisfies a preset parameter requirement, generating an adjustment instruction and sending the adjustment instruction to the storage unit via the delivery unit.

The preset parameter requirement refers to a preset requirement to be met by the evaluation parameter when generating the adjustment instruction. In some embodiments, the preset parameter requirement may include the remaining storage capacity of the storage unit being less than a preset capacity threshold, the read speed being less than a preset read speed threshold, the write speed being less than a preset write speed threshold, the response time being greater than a preset time threshold, etc. The preset capacity threshold, the preset read speed threshold, the preset write speed threshold, and the preset time threshold may be pre-determined by a staff member or processor based on historical experience.

The adjustment instruction refers to an instruction for adjusting the storage unit.

In some embodiments, the adjustment instruction may include a deletion instruction used to perform a deletion of object data, and the deletion instruction may include a timestamp of the object data.

The deletion instruction is an instruction for deleting the object data of the appurtenant monitoring device. In some embodiments, the object data includes historical maintenance data and/or data collection information corresponding to the appurtenant monitoring device.

The timestamp refers to a historical time point for deleting the object data of the appurtenant monitoring device, and different timestamps correspond to different appurtenant monitoring devices. By way of example, if the timestamp of the gas alarm is a specified time on a specified day of a specified month of a specified year, the smart gas pipeline network safety management platform 130 may determine the data collected or generated by the gas alarm up to the specified time on the specified day of the specified month of the specified year as the object data and delete all of the object data.

In some embodiments, the timestamp is determined based on an importance level of the appurtenant monitoring device.

The importance level refers to a degree of importance of the appurtenant monitoring device in gas usage. In some embodiments, the smart gas pipeline network safety management platform 130 may determine the importance level of the appurtenant monitoring device based on an average daily gas flow volume of the gas pipeline in which the appurtenant monitoring device is located and a gas user type. For example, the greater the average daily gas flow volume of the gas pipeline, the higher the importance level of the appurtenant monitoring device on the gas pipeline. As another example, the gas user type may include a commercial user type, a residential user type, or the like, and the importance level of the appurtenant monitoring device on the gas pipeline for the commercial user type may be higher.

In some embodiments, the higher the importance level of the appurtenant monitoring device, the longer a time interval between the timestamp of the appurtenant monitoring device and a current time point.

In some embodiments, the adjustment instruction may include a frequency adjustment instruction.

The frequency adjustment instruction refers to an instruction for adjusting the initial preset frequency, and the frequency adjustment instruction includes an adjusted preset frequency. In some embodiments, the smart gas pipeline network safety management platform 130 may determine the frequency adjustment instruction based on the climate dryness and the airborne dust concentration. For example, the climate is drier and the airborne dust concentration is higher, the frequency adjustment instruction may be used to adjust the initial preset frequency so that the adjusted preset frequency is lower than the initial preset frequency.

In some embodiments, the smart gas pipeline network safety management platform 130 may send the deletion instruction and the frequency adjustment instruction to the storage unit in various feasible ways. For example, the smart gas pipeline network safety management platform 130 may send the deletion instruction and the frequency adjustment instruction to the storage unit via Wi-Fi, Bluetooth, Ethernet, or the like.

In some embodiments of the present disclosure, through the historical maintenance data and the data collection information of the appurtenant monitoring device, it is possible to more accurately determine whether or not the appurtenant monitoring device requires maintenance, which helps to avoid delayed maintenance of the appurtenant monitoring device, thereby effectively reducing the probability of failure of the appurtenant monitoring device and enhancing users' experience with gas usage and the lifespan of gas pipelines.

Figure 3:
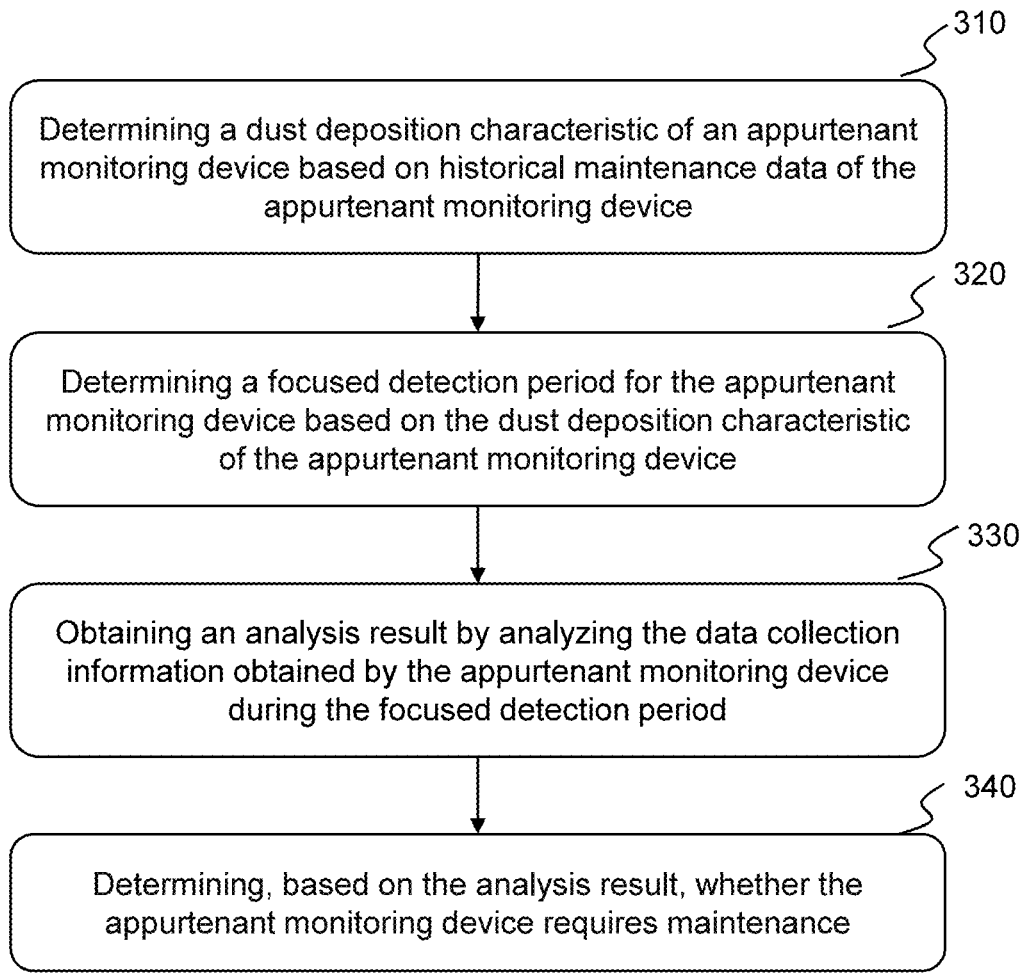
FIG. 3 is a flowchart illustrating an exemplary process for determining whether or not an appurtenant monitoring device requires maintenance according to some embodiments of the present disclosure.

FIG. 3 is a flowchart illustrating an exemplary process for determining whether or not an appurtenant monitoring device requires maintenance according to some embodiments of the present disclosure.

As shown in FIG. 3, a process 300 includes the following operations. In some embodiments, the process 300 may be executed by the smart gas pipeline network safety management platform 130.

In 310, determining a dust deposition characteristic of an appurtenant monitoring device based on historical maintenance data of the appurtenant monitoring device.

The dust deposition characteristic refers to data information related to dust accumulation on a surface of the appurtenant monitoring device. In some embodiments, the dust deposition characteristic includes a historical dusting rate.

The historical dusting rate refers to a rate at which dust is accumulated on the surface of the appurtenant monitoring device over a historical period of time. In some embodiments, the smart gas pipeline network safety management platform 130 may determine the historical dusting rate of the appurtenant monitoring device by the following operations.

In S1, selecting a plurality of pieces of consecutive historical maintenance data within a predetermined time range from a current time point.

In S2, determining a plurality of historical dusting rates for the appurtenant monitoring device based on any two adjacent pieces of historical maintenance data of the plurality of consecutive historical maintenance data.

In some embodiments, the smart gas pipeline network safety management platform 130 may determine the historical dusting rate using the following equation (1).

$$v \frac{Q_{i+1}}{t_{i+1} - t_i} \times 100\% \tag{1}$$

Wherein, v denotes the historical dusting rate, $Q_{i+1}$ denotes a historical dust deposition amount in a (i+1)-th piece of historical maintenance data, $t_{i+1}$ denotes a maintenance time corresponding to the (i+1)-th piece of historical maintenance data, and $t_i$ denotes a maintenance time corresponding to an i-th piece of historical maintenance data. More descriptions of the historical dust deposition amount and the maintenance time may be found in FIG. 2 and its related descriptions.

In S3, determining a weighted average of the plurality of historical dusting rates as a current dusting rate of the appurtenant monitoring device.

Weights of the plurality of historical dusting rates correlate to the time interval between two adjacent maintenance times, i.e., the larger the time interval, the larger the weight corresponding to the historical dusting rate.

In 320, determining a focused detection period for the appurtenant monitoring device based on the dust deposition characteristic of the appurtenant monitoring device.

The focused detection period refers to a period in which data collection information does not satisfy a preset requirement. In some embodiments, during the focused detection period, an excessive dust deposition amount of the appurtenant monitoring device may cause a data collection characteristic of the appurtenant monitoring device to exceed a preset collection characteristic threshold, and the preset collection characteristic threshold may be predetermined by a staff member or processor based on historical experience. More descriptions of the data collection characteristic may be found in the following related descriptions.

In some embodiments, the smart gas pipeline network safety management platform 130 may determine the focused detection period through vector retrieval based on the dust deposition characteristic. The focused detection period may be determined in a similar manner to the determination of the maintenance status of the appurtenant monitoring device. More descriptions may be found in the preceding related descriptions.

In some embodiments, the smart gas pipeline network safety management platform 130 may be configured to determine, based on the dust deposition characteristic of the appurtenant monitoring device, one or more dust deposition amounts of the appurtenant monitoring device corresponding to one or more future time points, and determine the focused detection period based on a future time point of the one or more future time points when a dust deposition amount exceeds a dust deposition threshold.

A dust deposition amount refers to an amount of dust that will cover the appurtenant monitoring device at a future time point. The dust deposition threshold refers to a threshold for determining the focused detection period, and the dust deposition threshold may be pre-determined by a staff member or processor based on historical experience.

In some embodiments, the dust deposition amount of the appurtenant monitoring device is positively related to the current dusting rate of the appurtenant monitoring device and the time interval between a future time point and the current time point, respectively. For example, the smart gas pipeline network safety management platform 130 may determine the dust deposition amount corresponding to a future time point based on the following equation (2).

$$Q_t = v1 \cdot T \quad (2)$$

Wherein, $Q_t$ denotes the dust deposition amount corresponding to the future time point, $v1$ denotes the current dusting rate of the appurtenant monitoring device, and T denotes the time interval between the future time point and the current time point.

In some embodiments, the smart gas pipeline network safety management platform 130 may determine a dust deposition amount that is greater than the dust deposition threshold by using the equation (2), and determine the future time point corresponding to the dust deposition amount as a time point in the focused detection period.

In some embodiments of the present disclosure, by determining the dust deposition amounts of the appurtenant monitoring device corresponding to future time points based on the dust deposition characteristic and determining the focused detection period by comparing the dust deposition amounts with the dust deposition threshold, the focused detection period can be determined efficiently, and the data collection information can be obtained and analyzed in a timely manner.

In 330, obtaining an analysis result by analyzing the data collection information obtained by the appurtenant monitoring device during the focused detection period.

More descriptions of obtaining the data collection information may be found in FIG. 2 and its related descriptions.

The analysis result refers to a result that is used to determine whether or not the appurtenant monitoring device requires maintenance.

In some embodiments, the smart gas pipeline network safety management platform 130 may analyze the data collection information in a variety of ways to obtain the analysis result. For example, the smart gas pipeline network safety management platform 130 may compare a difference between the data collection information obtained by the appurtenant monitoring device during the focused detection period and standard data collection information. The greater the difference, the greater the need for maintenance of the appurtenant monitoring device. The standard data collection information refers to the data collection information during normal operation of the appurtenant monitoring device.

In some embodiments, the smart gas pipeline network safety management platform 130 is configured to determine the data collection characteristic of the appurtenant monitoring device based on the data collection information obtained by the appurtenant monitoring device during the focused detection period and determine the analysis result based on the data collection characteristic.

The data collection characteristic refers to data used to characterize the data collection information. For example, the data collection characteristic includes an average response time, a stability of response time, or the like.

In some embodiments, the smart gas pipeline network safety management platform 130 may determine an average value of response time in a response time sequence and determines the average value as the average response time. The stability of response time refers to a degree to which the response time in the response time sequence remain stable. For example, the stability of response time is negatively correlated with a standard deviation of the response times in the response time sequence, i.e., the larger that standard deviation is, the greater a magnitude of change in the response time in the response time sequence is, and the less the stability of response time is.

In some embodiments, determining the focused detection period based on the dust deposition amount of the appurtenant monitoring device and obtaining the data collection information during the focused detection period enables ignoring appurtenant monitoring devices that have abnormal data collection due to failures of the appurtenant monitoring devices. Maintenance is only performed on the appurtenant monitoring device with abnormal data collection due to an excessively large dust deposition amount, thus saving computational resources.

In some embodiments, the data collection information may further include a value of collected target data, and the data collection characteristic may further include a data quality characteristic, which may include a data consistency degree corresponding to the target data.

The target data refers to data collected by the appurtenant monitoring device related to the operation of the gas pipeline, and different appurtenant monitoring devices correspond to different target data. For example, the target data corresponding to a gas alarm includes a gas concentration, a battery power of the gas alarm, or the like; the target data corresponding to a smoke sensor includes a smoke concentration, a battery power of the smoke sensor, or the like; the target data corresponding to an ignition protection device includes a flame intensity, a flame stability, or the like; the target data corresponding to a leakage protector includes a leakage current, or the like.

The data quality characteristic refers to a parameter that reflects the quality of the target data. The data consistency degree refers to a degree to which a plurality of sets of target data remain consistent. For example, the smaller a range of fluctuations in the values of the plurality of sets of target data, the closer the values of the plurality of sets of target data, the higher the data consistency degree.

In some embodiments, the smart gas pipeline network safety management platform 130 may determine the data quality characteristic through a variety of data processing techniques. For example, the smart gas pipeline network safety management platform 130 may determine the data consistency degree through scatter plots, line plots, or the like of the target data.

In some embodiments, the smart gas pipeline network safety management platform 130 may be configured to determine the data collection information based on at least one data collection performed according to a preset pattern by the appurtenant monitoring device during the focused detection period, and determine the data quality characteristic based on the value of the target data in the data collection information.

The preset pattern refers to a predetermined pattern used for performing data collection. For example, the smart gas pipeline network safety management platform 130 may be configured to obtain the data collection information of the appurtenant monitoring device at least twice consecutively at a preset time interval. The preset time interval may be predetermined by a staff member or a processor based on historical experience.

In some embodiments, the smart gas pipeline network safety management platform 130 may be configured to obtain the data collection information of the appurtenant monitoring device according to the preset pattern, determine a plurality of similarity degrees between any two sets of target data in a plurality of sets of the data collection information, respectively, and determine an average value of the plurality of similarity degrees as the data consistency degree.

In some embodiments of the present disclosure, the data quality characteristic (i.e., the data consistency degree) is determined by the value of the target data in the data collection information, and a discrepancy between different sets of target data collected by the appurtenant monitoring device can be determined based on the data quality characteristic, and thus it is possible to determine more accurately whether an abnormality occurs in the appurtenant monitoring device.

In some embodiments, the smart gas pipeline network safety management platform 130 may determine the analysis result of the appurtenant monitoring device based on the average response time, the stability of response time, and the data quality characteristic through vector retrieval. The analysis result is determined in a similar manner to the determination of the maintenance status of the appurtenant monitoring device, as may be found in the preceding related descriptions.

In 340, determining, based on the analysis result, whether the appurtenant monitoring device requires maintenance.

In some embodiments, in response to determining that the analysis result satisfies a preset maintenance condition, the smart gas pipeline network safety management platform 130 may determine that the appurtenant monitoring device requires maintenance.

In some embodiments, if any one of the following condition is satisfied: the average response time is greater than a preset average response time threshold, the stability of response time is less than a preset stability threshold, and the data quality characteristic is less than a preset data quality characteristic threshold, then the analysis result satisfies the preset maintenance condition. The preset average response time threshold, the preset stability threshold, and the preset data quality characteristic threshold may be predetermined by a staff member or processor based on historical experience.

In some embodiments of the present disclosure, it can be determined whether or not the appurtenant monitoring device requires maintenance timely and effectively based on the analysis result, avoiding poor user experience in gas usage due to an abnormality of the appurtenant monitoring device.

Figure 4:
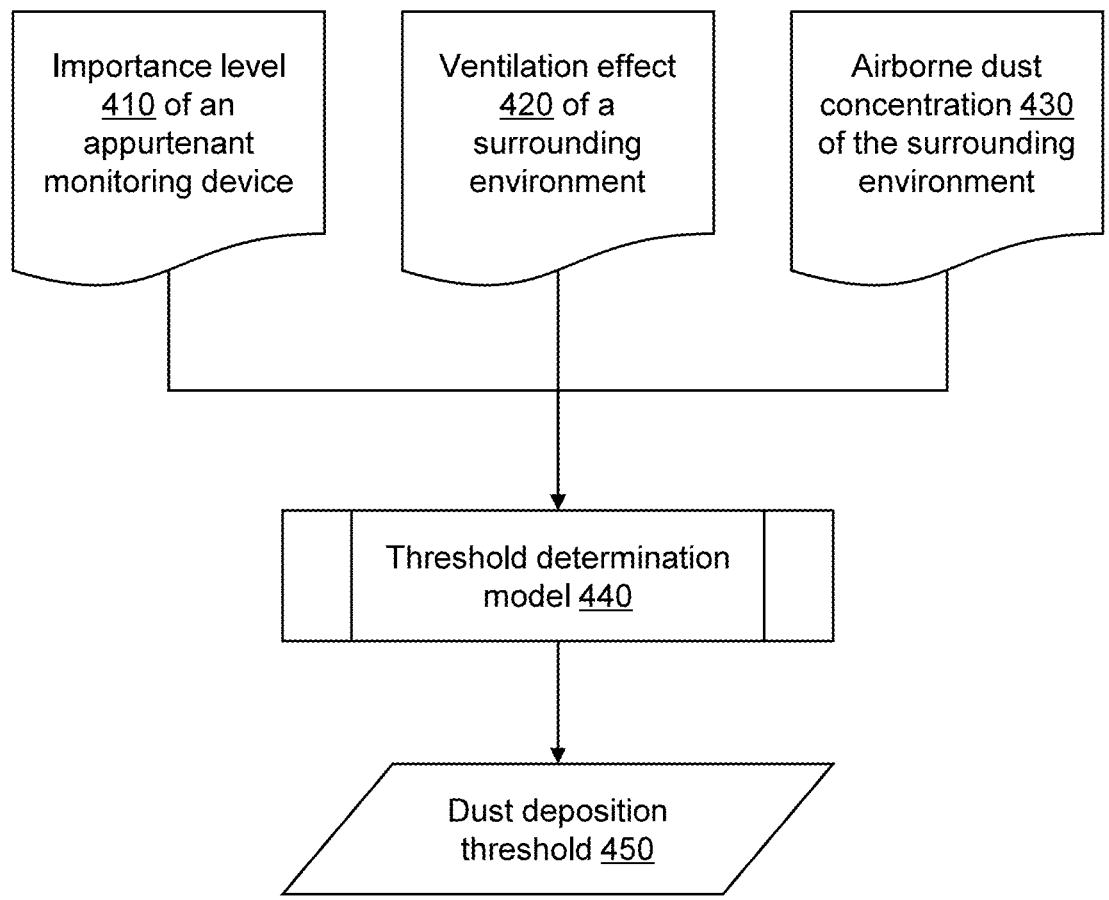
FIG. 4 is a schematic diagram illustrating a threshold determination model according to some embodiments of the present disclosure.

FIG. 4 is a schematic diagram illustrating a threshold determination model according to some embodiments of the present disclosure.

In some embodiments, a processor may determine, based on an importance level 410 of an appurtenant monitoring device, a ventilation effect 420 of a surrounding environment, and an airborne dust concentration 430 of the surrounding environment, a dust deposition threshold 450 of the appurtenant monitoring device via a threshold determination model 440. More descriptions of the appurtenant monitoring device and the importance level of the appurtenant monitoring device may be found in FIG. 2 and its related descriptions. More descriptions of the dust deposition threshold may be found in FIG. 3 and its related descriptions.

The ventilation effect 420 of the surrounding environment refers to an effect of air circulation in the surrounding environment of the appurtenant monitoring device. The ventilation effect may be expressed using an air flow rate of the surrounding environment of the appurtenant monitoring device. The greater the air flow rate, the better the ventilation effect.

The airborne dust concentration 430 of the surrounding environment refers to a dust content of the air in the surrounding environment of the appurtenant monitoring device. The airborne dust concentration may be determined in a variety of ways.

In some embodiments, the smart gas pipeline network safety management platform 130 may measure the airborne dust concentration in the surrounding environment of the appurtenant monitoring device via a dust concentration sensor.

In some embodiments, the dust deposition threshold is negatively correlated to at least one of the importance level of the appurtenant monitoring device and the airborne dust concentration of the surrounding environment of the appurtenant monitoring device; or, the dust deposition threshold is positively correlated to the ventilation effect of the surrounding environment of the appurtenant monitoring device. For example, the greater the airborne dust concentration of the surrounding environment, the faster dust accumulates on the appurtenant monitoring device, and the dust deposition threshold may be lowered to allow for the timely supervision and evaluation of data collection of the appurtenant monitoring device. The better the ventilation effect of the surrounding environment, the less likely dust accumulates on the appurtenant monitoring device, and the dust deposition threshold may be appropriately increased to save computing resources. The higher the importance level of the appurtenant monitoring device, the more stringent its supervision may be, i.e., the dust deposition threshold may be lowered to promptly detect and address issues.

The threshold determination model refers to a model for determining the dust deposition threshold corresponding to the appurtenant monitoring device. In some embodiments, the threshold determination model may be a machine learning model, e.g., the threshold determination model may be any one of a deep neural network (DNN) model, a convolutional neural network (CNN) model, or the like, or a combination thereof.

In some embodiments, an input of the threshold determination model may include at least one of the importance level of the appurtenant monitoring device, the ventilation effect of the surrounding environment, and the airborne dust concentration of the surrounding environment, and an output of the threshold determination model may include the dust deposition threshold corresponding to the appurtenant monitoring device.

In some embodiments, the threshold determination model may be obtained through training based on a large number of first training samples with first labels. In some embodiments, each set of training samples of the first training samples may include the importance level of a sample appurtenant monitoring device, the ventilation effect of a surrounding environment of the sample appurtenant monitoring device, and the airborne dust concentration of the surrounding environment of the sample appurtenant monitoring device, and the first training samples may be obtained from historical data.

In some embodiments, the first labels of the first training samples may be obtained through manual or automatic annotation. For example, when any item (e.g., the average response time, the stability of response time, etc.) of the data collection characteristic of the sample appurtenant monitoring device exceeds a corresponding threshold, a staff member may label the dust deposition amount corresponding to the sample appurtenant monitoring device as the first label of the first training sample. More descriptions of the data collection characteristic may be found in FIG. 3 and its related descriptions.

In some embodiments, the threshold determination model may be obtained by training a plurality of first training samples with first labels. For example, a staff member may input the plurality of first training samples with first labels into an initial threshold determination model, construct a loss function based on the first labels and an output of the initial threshold determination model, and iteratively update a parameter of the initial threshold determination model based on the loss function using various techniques (e.g., gradient descent, etc.). In some embodiments, when the trained initial threshold determination model satisfies a preset condition, the training is completed and the trained threshold determination model is obtained. The preset condition may include that the loss function result converges or is less than a preset result threshold, a count of iterations reaches an iteration threshold, or the like. The preset result threshold and the iteration threshold are used to determine whether or not to end the model training and may be preset manually.

Figure 5:
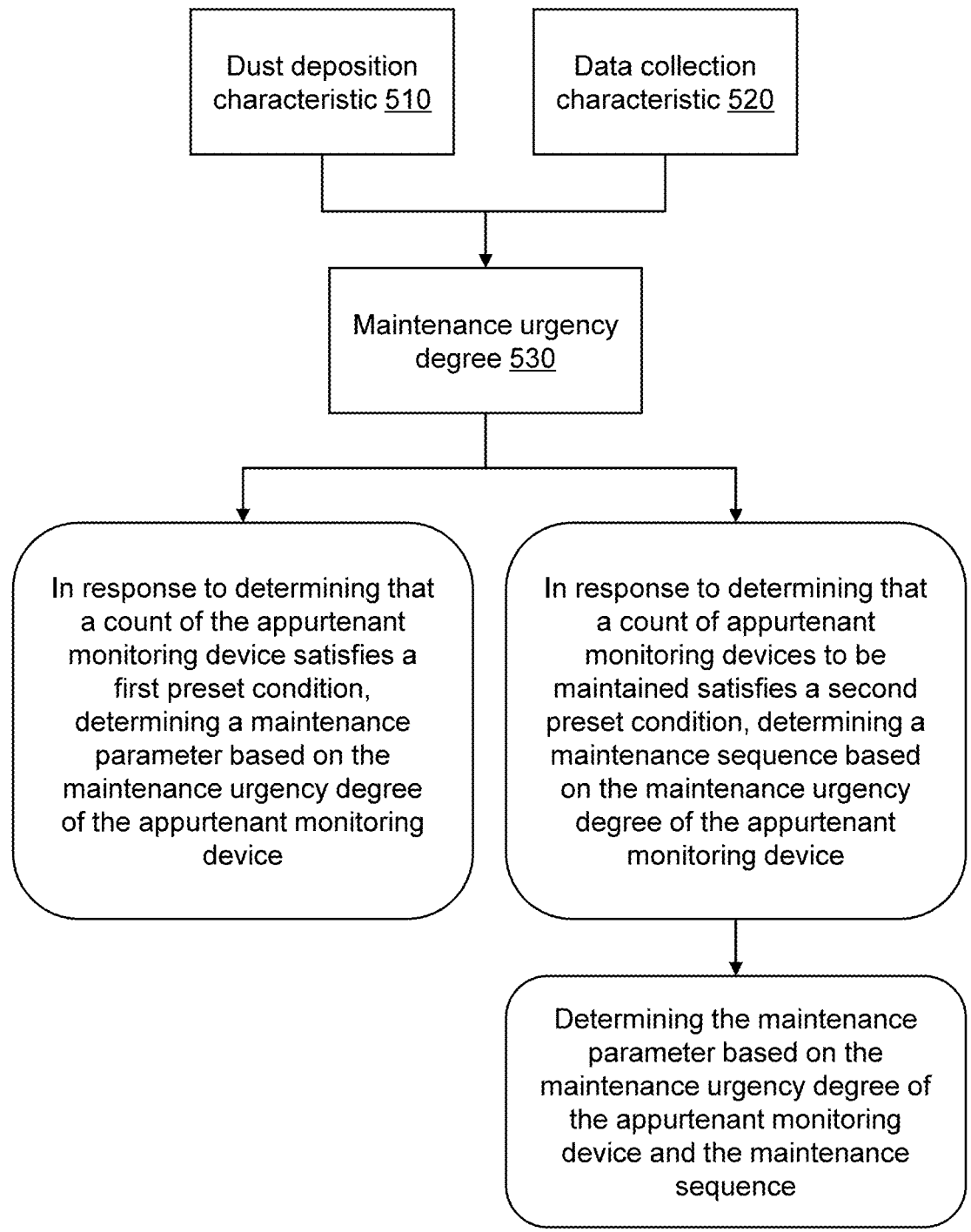
FIG. 5 is a schematic diagram illustrating a determination of a maintenance parameter according to some embodiments of the present disclosure.

FIG. 5 is a schematic diagram illustrating a determination of a maintenance parameter according to some embodiments of the present disclosure.

As shown in FIG. 5, in some embodiments, the smart gas pipeline network safety management platform 130 is configured to determine, based on a dust deposition characteristic 510 and a data collection characteristic 520 of an appurtenant monitoring device, a maintenance urgency degree 530 of the appurtenant monitoring device. In response to determining that a count of the appurtenant monitoring device satisfies a first preset condition, the smart gas pipeline network safety management platform 130 may determine a maintenance parameter based on the maintenance urgency degree 530 of the appurtenant monitoring device. In response to determining that a count of appurtenant monitoring devices to be maintained satisfies a second preset condition, the smart gas pipeline network safety management platform 130 may determine a maintenance sequence based on the maintenance urgency degree 530 of the appurtenant monitoring device, and determine the maintenance parameter based on the maintenance urgency degree 530 of the appurtenant monitoring device and the maintenance sequence.

In some embodiments, the smart gas pipeline network safety management platform 130 may determine the maintenance urgency degree of the appurtenant monitoring device based on the dust deposition characteristic and the data collection characteristic via a maintenance urgency degree relationship table.

The maintenance urgency degree relationship table refers to a preset table that includes a correspondence between the dust deposition characteristic, the data collection characteristic, and the maintenance urgency degree, and the maintenance urgency degree relationship table may be constructed based on a correspondence between a historical dust deposition characteristic, a historical data collection characteristic, and a historical maintenance urgency degree.

In some embodiments, the maintenance urgency degree is positively correlated to a dusting rate and a weighted sum of characteristic evaluation values, respectively. The characteristic evaluation value refers to a difference between an abnormal data collection characteristic value and a characteristic threshold corresponding to the abnormal data collection characteristic value.

The characteristic evaluation value is a value used to evaluate a degree of abnormality of abnormal data collection characteristic. The abnormal data collection characteristic refers to a data collection characteristic (e.g., an average response time, a stability of response time, etc.) that exceeds a corresponding preset threshold. For example, if the average response time is greater than a preset average response time threshold, the average response time of the appurtenant monitoring device at this time is an abnormal data collection characteristic, and accordingly, the characteristic evaluation value of the appurtenant monitoring device at this time is the difference between the average response time and the preset average response time threshold.

In some embodiments, the smart gas pipeline network safety management platform 130 may determine the maintenance urgency degree using the following equation (3):

$$D = v1 \cdot \sum T_j \cdot a_j \qquad (3)$$

Wherein, D denotes the maintenance urgency degree, v1 denotes a current dusting rate of the appurtenant monitoring device, Tj denotes the characteristic evaluation value of a j-th abnormal data collection characteristic, and aj denotes a weight corresponding to the j-th abnormal data collection characteristic.

In some embodiments, the weight of the abnormal data collection characteristic is positively correlated to the degree of abnormality (i.e., the characteristic evaluation value) of the abnormal data collection characteristic, and the greater the degree of abnormality of the abnormal data collection characteristic, the greater the weight of the abnormal data collection characteristic.

In some embodiments, by correlating the weight of the characteristic evaluation value with the degree of abnormality of the abnormal data collection characteristic, the characteristic evaluation value can accurately reflect an impact of the abnormal data collection characteristic on the maintenance urgency degree, thereby improve the accuracy of the maintenance urgency degree and effectively guiding a staff member to perform maintenance.

In some embodiments, by determining the maintenance urgency degree of the appurtenant monitoring device, the staff member can reasonably arrange a maintenance strategy for the appurtenant monitoring device, avoiding a negative impact on user experience in gas usage due to insufficiently timely maintenance of the appurtenant monitoring device.

The first preset condition refers to a pre-determined condition for determining the maintenance parameter. In some embodiments, the first preset condition may include that the count of the appurtenant monitoring devices is one.

In some embodiments, the smart gas pipeline network safety management platform 130 may determine the maintenance parameter in various ways based on the maintenance urgency degree of the appurtenant monitoring device. For example, the maintenance parameter includes maintenance personnel, and when the maintenance urgency degree of a specific appurtenant monitoring device is higher, the smart gas pipeline network safety management platform 130 may assign the maintenance personnel with a longer service life to carry out maintenance of the appurtenant monitoring device.

The second preset condition refers to a pre-determined condition for determining the maintenance urgency degree. In some embodiments, the second preset condition may include that the count of appurtenant monitoring devices is multiple.

In some embodiments, when a plurality of appurtenant monitoring devices requires maintenance, the maintenance sequence of the plurality of appurtenant monitoring devices correlates to the maintenance urgency degree, i.e., the higher the maintenance urgency degree of an appurtenant monitoring device, the higher a maintenance priority of the appurtenant monitoring device in the maintenance sequence, and the earlier the appurtenant monitoring device is maintained.

In some embodiments, the smart gas pipeline network safety management platform 130 may determine the maintenance parameter based on the maintenance urgency degree and the maintenance sequence of the appurtenant monitoring device in a variety of ways. In some embodiments, the maintenance parameter includes a maintenance scheduling table, and the maintenance scheduling table refers to a scheduling table for the maintenance personnel to perform maintenance on the appurtenant monitoring device. For example, the smart gas pipeline network safety management platform 130 may set a higher maintenance priority for an appurtenant monitoring device with a higher maintenance urgency degree, and place the appurtenant monitoring device earlier in the maintenance sequence, thereby generating the final maintenance scheduling table.

In some embodiments of the present disclosure, determining the maintenance parameter based on the maintenance urgency degree of the appurtenant monitoring device and the maintenance sequence allows for reasonable arrangement of the maintenance personnel to carry out maintenance on the appurtenant monitoring device, thereby improving the efficiency and quality of appurtenant monitoring device maintenance.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been configured to describe embodiments of the present disclosure; For example, the terms "one embodiment," "an embodiment," and/or "some embodiments" mean that a particular feature, structure, or characteristic described in connection with the embodiment is included in at least one embodiment of the present disclosure; Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure;

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties configured to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present disclosure, or any of same that may have a limiting effect as to the broadest scope of the claims now or later associated with the present disclosure. By way of example, should there be any inconsistency or conflict between the description, definition, and/or the use of a term associated with any of the incorporated material and that associated with the present disclosure, the description, definition, and/or the use of the term in the present disclosure shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for maintaining an appurtenant facility of a smart gas pipeline network, wherein the method is executed by a smart gas pipeline network safety management platform, and the method comprises:

obtaining historical maintenance data of an appurtenant monitoring device based on an interactive interface and storing the historical maintenance data in a storage unit;

controlling the appurtenant monitoring device, at an initial preset frequency, to acquire data collection information and storing the data collection information in the storage unit;

determining a dust deposition characteristic of the appurtenant monitoring device based on the historical maintenance data of the appurtenant monitoring device;

determining a focused detection period for the appurtenant monitoring device based on the dust deposition characteristic of the appurtenant monitoring device, including:

determining, based on the dust deposition characteristic of the appurtenant monitoring device, one or more dust deposition amounts of the appurtenant monitoring device corresponding to one or more future time points; and determining the focused detection period based on a future time point of the one or more future time points when a dust deposition amount exceeds a dust deposition threshold;

obtaining an analysis result by analyzing the data collection information obtained by the appurtenant monitoring device during the focused detection period;

determining, based on the analysis result, whether the appurtenant monitoring device requires maintenance;

in response to determining that the appurtenant monitoring device requires maintenance, determining a maintenance urgency degree of the appurtenant monitoring device based on the dust deposition characteristic of the appurtenant monitoring device and a data collection characteristic of the appurtenant monitoring device;

determining a maintenance parameter, wherein the determining the maintenance parameter includes:

in response to determining that a count of the appurtenant monitoring device satisfies a first preset condition, determining the maintenance parameter based on the maintenance urgency degree of the appurtenant monitoring device; or in response to determining that the count of appurtenant monitoring devices to be maintained satisfies a second preset condition, determining a maintenance sequence based on the maintenance urgency degree of the appurtenant monitoring device; and determining the maintenance parameter based on the maintenance urgency degree of the appurtenant monitoring device and the maintenance sequence;

generating a maintenance instruction based on the maintenance parameter;

sending the maintenance instruction to the interactive interface via a delivery unit;

obtaining an evaluation parameter of the storage unit, the evaluation parameter including at least one of a remaining storage capacity, a read speed, a write speed, and a response time;

in response to determining that the evaluation parameter of the storage unit satisfies a preset parameter requirement, generating an adjustment instruction and sending the adjustment instruction to the storage unit via the delivery unit, wherein the adjustment instruction includes a deletion instruction and/or a frequency adjustment instruction;

the deletion instruction is used to perform a deletion of object data, the deletion instruction includes a timestamp of the object data, the timestamp is determined based on an importance level of the appurtenant monitoring device, and the object data includes the historical maintenance data and/or the data collection information of the appurtenant monitoring device; and the frequency adjustment instruction is used to adjust the initial preset frequency, and the frequency adjustment instruction includes an adjusted preset frequency.

2. The method of claim 1, wherein the dust deposition threshold is negatively correlated to at least one of an airborne dust concentration in a surrounding environment of the appurtenant monitoring device and the importance level of the appurtenant monitoring device; or, the dust deposition threshold is positively correlated to a ventilation effect of the surrounding environment of the appurtenant monitoring device.

3. The method of claim 1, wherein the obtaining an analysis result by analyzing the data collection information obtained by the appurtenant monitoring device during the focused detection period includes:

Determining the data collection characteristic of the appurtenant monitoring device based on the data collection information acquired by the appurtenant monitoring device during the focused detection period; and determining the analysis result based on the data collection characteristic.

4. An Internet of Things (IoT) system for maintaining an appurtenant facility of a smart gas pipeline network, wherein the IoT system comprises a smart gas pipeline network safety management platform, and the smart gas pipeline network safety management platform is configured to:

obtain historical maintenance data of an appurtenant monitoring device based on an interactive interface and storing the historical maintenance data in a storage unit;

control the appurtenant monitoring device, at an initial preset frequency, to acquire data collection information and storing the data collection information in the storage unit;

determine a dust deposition characteristic of the appurtenant monitoring device based on the historical maintenance data of the appurtenant monitoring device;

determine a focused detection period for the appurtenant monitoring device based on the dust deposition characteristic of the appurtenant monitoring device, wherein the smart gas pipeline network safety management platform is further configured to:
  determine, based on the dust deposition characteristic of the appurtenant monitoring device, one or more dust deposition amounts of the appurtenant monitoring device corresponding to one or more future time points; and
  determine the focused detection period based on a future time point of the one or more future time points when a dust deposition amount exceeds a dust deposition threshold;

obtain an analysis result by analyzing the data collection information obtained by the appurtenant monitoring device during the focused detection period;

determine, based on the analysis result, whether the appurtenant monitoring device requires maintenance;

in response to determining that the appurtenant monitoring device requires maintenance,
  determine a maintenance urgency degree of the appurtenant monitoring device based on the dust deposition characteristic of the appurtenant monitoring device and a data collection characteristic of the appurtenant monitoring device;

determine a maintenance parameter, wherein the determine the maintenance parameter includes:
  in response to determining that a count of the appurtenant monitoring device satisfies a first preset condition, a determining the maintenance parameter based on the maintenance urgency degree of the appurtenant monitoring device; or
  in response to determining that a count of appurtenant monitoring devices to be maintained satisfies a second preset condition, determining a maintenance sequence based on the maintenance urgency degree of the appurtenant monitoring device; and determining the maintenance parameter based on the maintenance urgency degree of the appurtenant monitoring device and the maintenance sequence;

generate a maintenance instruction based on the maintenance parameter;

send the maintenance instruction to the interactive interface via a delivery unit;

obtain an evaluation parameter of the storage unit, the evaluation parameter including at least one of a remaining storage capacity, a read speed, a write speed, and a response time;

in response to determining that the evaluation parameter of the storage unit satisfies a preset parameter requirement, generate an adjustment instruction and send the adjustment instruction to the storage unit via the delivery unit, wherein the adjustment instruction includes a deletion instruction and/or a frequency adjustment instruction;

the deletion instruction is used to perform a deletion of object data, the deletion instruction includes a timestamp of the object data, the timestamp is determined based on an importance level of the appurtenant monitoring device, and the object data includes the historical maintenance data and/or the data collection information of the appurtenant monitoring device; and the frequency adjustment instruction is used to adjust the initial preset frequency, and the frequency adjustment instruction includes an adjusted preset frequency.

5. The IoT system of claim 4, further comprising a smart gas user platform, a smart gas service platform, a smart gas pipeline network sensing network platform, and a smart gas pipeline network object platform, wherein
  the smart gas user platform is configured to issue a query instruction for pipeline network risk assessment information and/or feed information from a gas user back to the smart gas service platform and receive the pipeline network risk assessment information uploaded by the smart gas service platform;
  the smart gas service platform is configured to receive the query instruction for the pipeline network risk assessment information issued by the smart gas user platform and upload the pipeline network risk assessment information to the smart gas user platform; issue the query instruction for the pipeline network risk assessment information to the smart gas pipeline network safety management platform; and receive the pipeline network risk assessment information uploaded by the smart gas pipeline network safety management platform;
  the smart gas pipeline network safety management platform is configured to receive the query instruction for the pipeline network risk assessment information issued by the smart gas service platform and upload the pipeline network risk assessment information to the smart gas service platform; issue an instruction for obtaining pipeline network monitoring related data to the smart gas pipeline network sensor network platform, and receive the pipeline network monitoring related data uploaded by the smart gas pipeline network sensor network platform;
  the smart gas pipeline network sensor network platform is configured to receive the instruction for obtaining the pipeline network monitoring related data issued by the smart gas pipeline network safety management platform and upload the pipeline network monitoring related data to the smart gas pipeline network safety management platform; issue the instruction for obtaining the pipeline network monitoring related data to the smart gas pipeline network object platform; and receive the pipeline network monitoring related data uploaded by the smart gas pipeline network object platform; and
  the smart gas pipeline network object platform is configured to receive the instruction for obtaining the pipeline network monitoring related data issued by the smart gas pipeline network sensor network platform and upload the pipeline network monitoring related data to the smart gas pipeline network sensor network platform.

* * * * *